Patented Sept. 16, 1941

2,256,128

UNITED STATES PATENT OFFICE 2,256,128

INK

Milton T. Supan, Red Bluff, Calif.

No Drawing. Application February 7, 1939, Serial No. 255,163

2 Claims. (Cl. 106—20)

This invention relates to improvements in writing inks and pertains particularly to an improved blue colored ink and method of making the same, which is primarily distinguished by the fact that it is of an intense blue color, has rapid drying qualities and does not require the addition to it of a body material or filler such as is used in writing inks as at present produced.

The present improved writing ink is produced from certain hot or warm spring deposited mineral substances which after treatment are acted upon by certain chemicals to produce the desired ink, the chemicals employed combining with the mineral substances from such deposits to produce the desired color and to simultaneously give to the ink a certain body which causes it to flow onto and adhere to a paper surface, the production of this body or filler in the ink during the reaction of the chemicals, thereby obviating the necessity of adding a filler substance to the finished ink.

In accordance with the present invention, there is obtained from the vicinity of the hot springs found particularly in California, near the town of Red Bluff, a mineral deposit which is brought to the surface of the ground by such springs and which forms on the surface as a crust or layer of soft easily powdered material, which forms the basic material for the production of the ink of the present invention. An analysis has been made of a specimen of this material with the following results. The specimen analyzed was found to contain 10.7% moisture. It was then dried and showed upon analysis the following constituents:

| | Per cent |
|---|---|
| Insoluble matter | 26.14 |
| Ferrous sulfate ($FeSO_4$) | 7.81 |
| Ferric sulfate $Fe_2(SO_4)_3$ | 26.85 |
| Ferric oxide ($Fe_2O_3$) | 1.59 |
| Aluminum sulfate $Al_2(SO_4)_3$ | 14.47 |
| Magnesium sulfate ($MgSO_4$) | 1.55 |
| Sodium sulfate ($Na_2SO_4$) | .69 |
| Water of crystallization and combined water | 20.90 |
| | 100.00 |

The insoluble matter contained 72.46% silica. The ferric sulphate and ferric oxide were combined to form 28.44% of basic ferric sulphate.

The mineral described is treated first by mixing a certain proportion of the same with water and after thoroughly stirring the mixture, allowing the insoluble matter to settle and drawing off the supernatant liquid. Approximately 12 hours is allowed for the settling action to take place and after making the mixture and allowing the settling to occur, the water will be found to have extracted the soluble portions of the chemical contents of the mineral and it will have a dark amber color somewhat resembling tea. This liquid, which is removed from the sediment has what might be termed a puckery taste or an acid or astringent taste. To this water solution of the soluble constituents of the mineral there is added a quantity of a solution of ferrocyanide of potassium which produces a blue coloration of the solution, the depth of the color being governed by the amount of the ferrocyanide solution added. This blue solution is then permitted to stand for approximately 12 hours after being first thoroughly stirred or agitated. When the two liquids are first mixed, a slight thickening of the mixture will occur and after the mixture has stood, a separation will occur with approximately the lower half of the solution showing a blue coloration while the upper half will present an amber appearance. This amber liquid is then removed and is given a treatment with more potassium ferrocyanide which results in the turning of the amber liquid blue and a slight thickening of the same, and this blue solution is then allowed to stand until there occurs a separation of a blue portion from a still lighter upper portion. These steps may be repeated as many times as desired until no further reaction is obtained with the drawn off clear or amber liquid and the ferrocyanide. In practice, satisfactory results have been obtained by discontinuing these steps after the second treatment with the ferrocyanide.

For the making of an analysis of a water solution of the mineral described, the analysis of the dry form of which has previously been given, a quantity of the mineral was added to a gallon of distilled water at room temperature and thoroughly shaken and mixed a number of times and allowed to stand several days. The solution obtained showed the following analysis:

| | Grs. per gal. |
|---|---|
| Ferrous sulfate ($Fe_2SO_4$) | 598 |
| Ferric sulfate $Fe_2(SO_4)_3$ | 2060 |
| Ferric oxide ($Fe_2O_3$) | 122 |
| Aluminum sulfate $Al_2(SO_4)_3$ | 1110 |
| Magnesium sulfate ($MgSO_4$) | 118 |
| Sodium sulfate ($Na_2SO_4$) | 53 |
| Volatile (water of crystallization) | 873 |
| | 4934 |

While I do not wish to be limited to the proportions of water and mineral initially mixed together, or to the exact strength of the potassium ferrocyanide solution, by way of illustration, it may be stated that the first mixture may be made up by stirring from 15 to 20 pounds of the mineral in 30 gallons of water, in a suitable receptacle. This mixture after being thoroughly stirred is allowed to stand for a period of 12 hours or more, as may be found desirable, and after the settlement of the undissolved portion of the mineral has taken place, the amber liquid thus formed is drawn off into a suitable receptacle. There is then thoroughly stirred into this amber liquid a solution of potassium ferrocyanide which is made by mixing approximately one-half pound of the chemical in a gallon of hot water. This is added directly to the amber solution and the entire mixture given a thorough stirring. When the chemical solution is added to the amber solution, a blue coloration of the solution will be obtained, together with a slight thickening of the same. This first chemically treated solution is then allowed to stand for 12 or more hours, whereupon it will be found that a separation has taken place and substantially the lower half of the solution will be of an intense blue while the upper half will be amber colored but lighter than the original amber solution. In starting, as stated, with 30 gallons of water, the major portion of the added mineral will be dissolved so that the amber solution first treated with the chemical will be of approximately 30 gallons bulk and after the blue portion of the solution has settled for the period stated, there will be approximately 15 gallons of the amber which may be drawn off. This amber solution which is drawn from the heavier blue solution is then given a further treatment with potassium ferrocyanide of substantially the same strength as originally used, that is, since there is now half as much amber solution to treat, there will be employed a solution containing one-quarter pound potassium cyanide dissolved in one-half gallon of hot water. This is thoroughly stirred into the amber liquid and the liquid allowed to stand again for approximately 12 hours, whereupon it will be found to have separated so that approximately one-half of it will be clear or substantially so, and the other half, the lower half of the solution, will be blue. The amber liquid is then drawn off and, if desired, may be discarded or it may be given a further treatment with the chemical. Assuming that no further treatment is to be given the amber liquid, then the blue solutions which have been obtained will be washed by placing them in a suitable receptacle and adding any desired quantity of clear water, thoroughly stirring and allowing the mixture to stand so as to effect a settlement of the blue portion whereupon the clear water will be drawn off. This washing step may be repeated as many times as may be necessary until the astringent character of the liquid has been destroyed. After the last so-called washing step of the blue solution has been completed and the solution has been allowed to stand until the desired separation of the blue part has taken place, a part only of the clear solution is drawn off, there being left a sufficient amount to thin out the heavier blue solution, so that the same will have a suitable consistency for writing purposes.

This final blue solution is then used as a stock solution for the making of the final ink product and the final product is obtained by adding to each quart of the blue solution 2 ounces of a solution of oxalic acid which is made in the proportions of 1 ounce of the acid to 1 quart of water, and 2 ounces of potassium ferrocyanide solution which is prepared by dissolving 1 ounce of the potassium ferrocyanide in 1 quart of water. When these chemicals are added to the stock solution, there will be formed an intense blue solution which may be used for writing purposes without the addition of any other substances thereto to provide body as is necessary in other types of inks. The oxalic acid added to the final solution serves the purpose of preventing any further separation in the solution.

While in describing the invention, potassium ferrocyanide or yellow prussiate of potash has been particularly referred to, it has been found that by the use of the red prussiate of potash or potassium ferricyanide, a green colored ink is obtained.

What is claimed is:

1. The method of producing an improved ink which comprises forming a solution of the water soluble reaction products by combining in water a natural mineral deposit having a dry analysis of 7.81% ferrous sulphate, 26.85% ferric sulphate, 1.59% ferric oxide, 14.47% aluminum sulphate, 1.55% magnesium sulphate, .69% sodium sulphate, 26.14% inert matter and 20.90% water of crystallization, with oxalic acid and a salt of iron selected from the group consisting of potassium ferrocyanide of iron and potassium ferricyanide of iron.

2. The method of producing a blue ink which comprises mixing with water a mineral deposit shown on analysis to contain ferrous sulphate 7.81%, ferric sulphate 26.85%, ferric oxide 1.59%, aluminum sulphate 14.47%, magnesium sulphate 1.55%, sodium sulphate .69%, allowing the solution to stand to effect the settlement of insoluble articles, removing the supernatent liquid, mixing with said supernatent liquid a substantially 5% solution of potassium ferrocyanide whereby an intense blue colored solution is obtained, allowing such solution to stand for a predetermined period for the separation of the solution into a lower blue colored portion and an upper substantially clear portion, drawing off said clear portion, then mixing with the blue colored portion solutions of potassium ferrocyanide and oxalic acid each of approximately 3% strength.

MILTON T. SUPAN.